United States Patent [19]

Geiger

[11] Patent Number: 5,174,403
[45] Date of Patent: Dec. 29, 1992

[54] FOOD PROCESSOR

[75] Inventor: Peter Geiger, Balingen, Fed. Rep. of Germany

[73] Assignee: BSG-Schalttechnik GmbH & Co., Balingen, Fed. Rep. of Germany

[21] Appl. No.: 635,184

[22] PCT Filed: Apr. 27, 1990

[86] PCT No.: PCT/EP90/00682

§ 371 Date: Jan. 3, 1991

§ 102(e) Date: Jan. 3, 1991

[87] PCT Pub. No.: WO90/13249

PCT Pub. Date: Nov. 15, 1990

[30] Foreign Application Priority Data

May 3, 1989 [DE] Fed. Rep. of Germany ....... 3914641

[51] Int. Cl.⁵ ............................................. G01G 19/00
[52] U.S. Cl. .................................................. 177/245
[58] Field of Search ...................... 177/245, 25.14, 229

[56] References Cited

U.S. PATENT DOCUMENTS 4,362,219 12/1982 Carlsson ............................. 177/245
4,840,239 6/1989 Slagg ............................... 177/25.14

Primary Examiner—George H. Miller, Jr.
Attorney, Agent, or Firm—Darby & Darby

[57] ABSTRACT

In connection with a food processor for any type of food preparation operations, such as mixing, stirring, kneading, or the like, with or without additional appliances that can be attached to the basic body of the food processor, and with an associated weighing system and a microprocessor which at least indicates the weighing results, it is proposed that for determining the weight of the ingredients to be processed a no-friction and no-contact leaf spring support is to be provided for decoupling an outer stationary housing from a decoupling carrier or frame in such a way that all the other components of the food processor are supported by the decoupling carrier and any variations of the weight of the latter can be recorded with high precision by weight sensors, preferably in the form of resistance strain gauges, mounted on the leaf springs.

12 Claims, 4 Drawing Sheets

FOOD PROCESSOR

BACKGROUND OF THE INVENTION

The present invention relates to a food processor according to the preamble of claim 1.

A known food processor of this type (U.S. Pat. No. 4,362,219) comprises weighing arms which can be pulled out at the front. A recess provided in the forward portion of the weighing arm in this extended position accepts a weighing basket which is suspended therein by the operator, and the tilting movement which the weighing arm performs, against the action of a flat spring, when being loaded by the material to be weighed, is transformed, via a toothing of a gearing, into a rotary movement which is transmitted to a code disk whose rotation is then measured electrically, by means of suitable circuit arrangements which may also comprise a microprocessor, and translated into a weight value which is then displayed by suitable display means provided on the food processor. The weighing bowl may then be relocated for having the food ingredients processed therein by the food processor.

Quite apart from the troublesome operations which cannot be avoided in the case of this known food processor and which consist in particular in the fact that one first has to estimate roughly the weight of the material in the bowl in order to pull out the desired weighing arm—the two arms provided being assigned to two different maximum weights—one probably also has to accept considerable losses in accuracy caused by frictional and hysteresis effects, and the like, due to the initial mechanical translation of the deflection of the weighing arm and the subsequent electric coding process. An additional problem is seen in the circumstance that the known appliance does not permit continuous measurements to be effected, for example by resetting of the measuring result, as the weighing bowl has to be changed if ingredients to be added in smaller quantities, for example, are to be weighed. Consequently, it is not possible to add all ingredients required for one recipe in succession and to determine their quantity by a consecutive weighing process.

This food processor, therefore, makes use only of a separate weighing system, without realizing a concept really integrating a food processor with a weighing system.

In this respect, the food processor known from German Utility Patent 18 94 430 can be regarded as a further development insofar as a weighing system, though operating in a very rough manner only, is integrated in one of the feet of the appliance, the structure being such that one of the feet is designed as a sliding tube and can be pushed into the housing of the appliance against the action of a biasing spring.

A toothing provided on the outer periphery of the vertically sliding tube forming one of the feet of a food processor is engaged by a rotary pinion which simultaneously supports a mechanical pointer the outer end of which is then in a position to indicate weight differences, moving along a rather coarsely graded, semicircular scale.

Consequently, it is in fact possible with this food processor to load the weighing system successively during food preparation, by filling in the ingredients in succession, so that differential measurements are also possible simply by memorizing former positions occupied by the pointer. However, more exact measurements are absolutely impossible with such a food processor, if only because frictional influences beyond any control are encountered in connection with the sliding properties of the pipe/foot of the appliance and in the area of the toothing, so that any thought of a weighing accuracy in the range of grams must be excluded from the very beginning.

Finally, a toy food processor with associated scales has been known from U.S. Pat. No. 3,171,634. In this case, the food processor is arranged at the end of a scale balance which is lowered in response to the weight of the food processor which movement is transferred to a pointer, via a double toggle lever system, which is thereby caused to move along a scale without numbering.

When preparing food with the aid of food processors, for example when preparing (bread) doughs or when mixing food according to predetermined recipes, it is frequently indispensable that the stated quantities or the ingredients, related to their weight, be closely adhered too. When preparing food for diabetics, for example, this is an absolute necessity for reasons of health.

On the other hand, the food processors of interest here are electrically driven which means that the recipients of the ingredients which are to be thoroughly mixed and brought into the desired form, for example by a mixing or kneading process, frequently have to stand considerable forces in the areas of engagement between the respective bowl and the machine, during such mixing or kneading processes.

If the ingredients required for a recipe are weighed separately, outside the food processor, or only on the latter (compare the before-mentioned U.S. Pat. No. 4,362,219), and are then filled into the common bowl, this leads to a considerable amount of work as the dish of the scales has to be cleaned for each ingredient, an operation which causes a lot of work in particular when liquid ingredients are to be weighed.

Therefore, it frequently happens that the weight of an ingredient is not determined at all, or only roughly, so that one cannot always be sure that the desired results will be actually achieved. It also happens that kitchen scales are either not available at all, or employed at a different place, and in addition kitchen scales do not always permit very exact measurements, most of them being based on the spring balance principle and using a little precise analog indication system.

Now, it is the object of the present invention to simplify decisively the process of determining the weight of foodstuff ingredients which are to be subjected to a subsequent processing operation in a food processor, either alone or together with other ingredients.

ADVANTAGES OF THE INVENTION

The invention achieves this object with the aid of the characterizing features of claim 1 and provides the advantage that highly precise measurements, including consecutive measurements, are rendered possible, with the aid and under the control of a suitably designed and programmed microprocessor or a similar control circuit, by decoupling an stationary housing, or at least a partial housing, from the food processing system as such, preferably by means of a leaf spring/rod arrangement, in combination with a separate decoupling carrier or decoupling frame, which then supports the whole food processor including its different components, whereby complete freeness from frictional effects is guaranteed.

The invention, therefore, succeeds in overcoming the previously unsurmountable problem of such food processors intended to perform simultaneous weighing operations, namely that a weighing system simply had to be attached separately to the food processor or that some weight-recording means had to be arranged in the feet of the food processor, usually in only one foot, and that one therefore not only had to accept the weighing errors resulting automatically from the frictional effect, which already excluded any accuracy in the weighing process, but had in addition to take into account that the measuring result was determined, at least partly, by positional influences, for example by the momentary location of the largest volume of the ingredients being measured. This is due to the fact that when only one foot performs the function of the "scales" then the other feet do not contribute to the measuring process so that the loading acting on the stationary feet is transmitted to the weighing foot as a function of its position, due to the lever effect about the stationary foot or the stationary feet.

On the other hand, if one tries to design all the feet of the food processor as weighing feet, then the basic position of the appliance becomes excessively instable so that it would be more convenient to design such an appliance as mere kitchen scales and to operate the food processor as a separate unit.

The basic idea of the present invention is, therefore, seen in the so-called decoupling carrier which on the one hand guarantees trouble-free operation of the unit as a food processor, and enables on the other hand highly precise weight measurements to be performed, the decoupling carrier being suspended, via plate springs or leaf springs, on the stationary outer housing, or partial outer housing, or only on an L-shaped bearing part which guarantees on the one hand a rigid, practically displacement-free suspension, and this also under load, while ensuring on the other hand that weighing processes can be carried out with an accuracy in the gram range, if suitable measuring sensors, preferably resistance strain gauges, are arranged in a convenient manner on or in the area of the leaf springs. Weight sensors in the form of resistance strain gauges are usually so sensitive that reproducible accuracies up to five positions can be achieved so that, assuming for example a total load of 10 Kg., the before-mentioned accuracy in the gram range is safely reached.

The invention therefore guarantees, with the aid of the scales system integrated in the food processor, that highly precise weight measurements of food ingredients which are to be processed in connection with the food processor, can be performed. In fact, even successive measurements can be carried out without any difficulty, the invention making use, or proposing to make use, of the microprocessors which are already frequently employed in connection with food processors for controlling the latter's sequences and operation, utilizing such microprocessors simultaneously for the two different functions, namely operational control of the food processor on the one hand and determination of the weight of the food ingredients on the other hand.

An additional advantage of the invention resides in the fact that by using decoupling leaf springs as an intermediate element in the arrangement of the measuring sensor, the weighing process may be related either to the whole weight or, if desired, to a partial weight of the food processor, in which latter case the individual weighing processes may be implemented by differential measurements and comparison with the respective preceding weight. At the same time, this arrangement prevents the necessity to arrange measuring sensors in the mechanical transmission area, for example between the mixing system and the bowl, and the machine housing on the other hand, as any such measuring sensors arranged at this point would be exposed to considerable wear or even destruction, or would at least not be in a position to operate with sufficient accuracy at these interfaces.

Another considerable advantage of the present invention is seen in the fact that in addition to the preferred use of resistance strain gauges, basically any types of suitable pickup systems may be employed as transducer for the determination of the weight, such as displacement/force pickups, differential moving-coil arrangements, piezoelectric system, inductive, capacitive and/or optical proximity systems or proximity switches, string balances, or the like.

Given the fact that the weighing system is combined with the food processor in connection with a microprocessor which has a sufficient number of storage positions, depending on its utilization, successive measurements can be performed with particular advantage. In this case, the operator may fill the mixing bowl initially with a predetermined quantity of flour, for example, then reset to zero the weight indicated by the system, via a suitable display (liquid crystal display), for example by operating a suitable key provided for this purpose on the food processor, then add a predetermined quantity by weight of eggs, followed by a predetermined quantity by weight of water, after the original indication has again be reset to zero, it being of course also possible, if desired, to store the displayed values in order to have them available for subsequent verification, or cause all the values measured to be displayed continuously.

When the entire weighting process for all ingredients has been completed, then the machine is transferred to the second operating mode, in which the food ingredients are processed mechanically, so that the microprocessor in charge of the entire control is not required to evaluate the weighing signals and to control the operating process simultaneously, but has to perform weighing processes only with the machine at rest, while it only has to control the operating sequence of the machine when the latter is running. This allows a low-cost solution, also for the electronic system to be employed.

The features set out in the subclaims permit advantageous improvements and further developments of the food processor specified in the main claim. According to a particularly advantageous embodiment, the leaf spring support may be given the shape of a rectangular hollow block—as illustrated in FIG. 7—having suitable elastic properties and effecting only very small deflections which are, however, absolutely sufficient for measuring the weight by means of resistance strain gauges, whereby the components of the food processor, which are supported on the decoupling carrier, are fixed to the stationary housing portion in a particularly safe manner.

BRIEF DESCRIPTION OF THE DRAWING

One embodiment of the invention will be described hereafter in more detail with reference to the drawing in which

FIG. 6 shows a flow diagram representing a possible program sequence of a food processor with integrated weighing system, intended for the weighing and simultaneous processing of food ingredients; while

DESCRIPTION OF THE EMBODIMENTS

The present invention relies on the basic idea that a food processor equipped with a microprocessor is combined with a weighing system which is at the same time decoupled relative to the food processor in such a way that the respective weighing processes can be performed with high and extremely high accuracy while at the same time perfect bearing and operating properties can be ensured for the food processor. This is achieved by the use of a decoupling carrier which on the one hand supports and carries the entire food processor structure while on the other hand, i.e. in relation to an outer stationary support, it is retained by firmly mounted flat, plate or leaf springs so that it is the leaf springs which will react to any changes in weight, and these can be measured best, and with particular advantage, by the use of resistance strain gauges mounted in flat arrangement directly on the said leaf springs.

Figure 1:
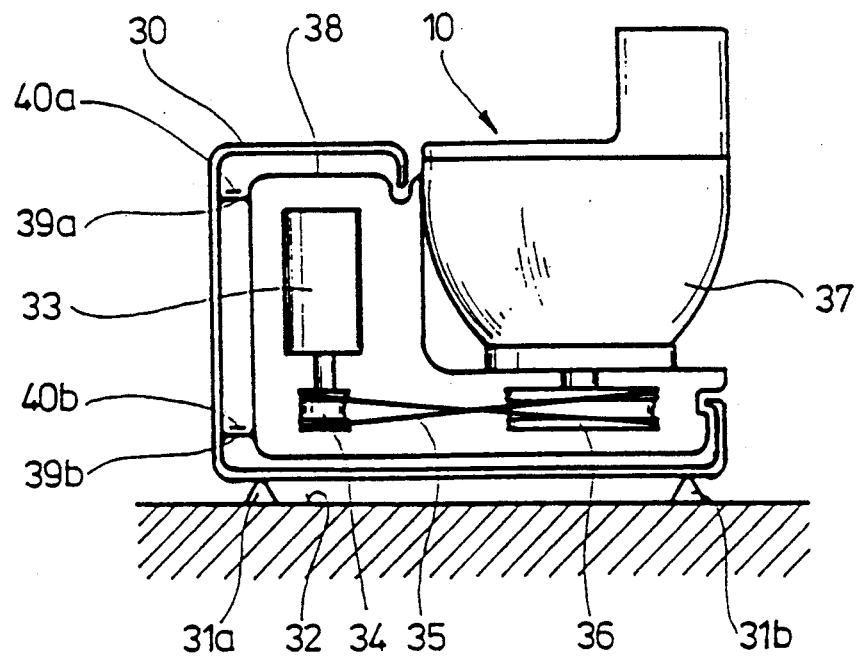
FIG. 1 shows a diagrammatic side view of a first embodiment of a food processor with an outer stationary partial housing resting firmly on a support, and an inner decoupling carrier.

In the case of the food processor 10 illustrated in FIG. 1, there is provided an outer housing, a partial housing or just a carrying member 30 which may basically have any desired shape and which rests firmly on a stationary support 32, via a corresponding number of feet 31a, 31b (in FIG. 1 only two of them can be seen, although preferably at least three, usually four feet are provided), or via an incorporated bottom plate.

In the case of the food processor 10 illustrated in FIG. 1, which only shows a lateral cross-section through the partial housing 30, the latter may enclose the entire interior installations of the food processor, i.e. the drive motor 33 with the power take-off belt pulley 34 mounted thereon, the driving belt 35 leading to the drive wheel 36 of the mixer mechanism illustrated by way of example and arranged inside the bowl 37, and other partial components of the switches, supply lines and control circuits not shown in the drawing, except for the bowl 37 itself and part of the intermediate carrier and/of the decoupling frame supporting the bowl.

The decoupling frame 38, which may have the most various forms and structures, is separated from the surrounding outer housing or partial housing 30 at any point, i.e. retained in the latter in no-contact relationship except for a leaf-spring support which interconnects the outer housing 30 and the decoupling carrier or decoupling frame 38 and which, in the illustrated embodiment, comprises two leaf springs 39a, 39b are arranged on one side only, in vertically spaced relationship and which are fixed in place on two ends, for example by welding.

In a broader sense, this leaf-spring support may of course also take the form of a suitable plate spring arrangement, a slightly resilient connection block of the type illustrated in FIG. 7, or of a complex structure of resilient elements similar to that shown in FIG. 8 (these latter two solutions will be discussed in more detail further below), the practical design being of minor importance. What really matters is the basic decoupling function realized between the outer, stationary housing, partial housing or outer carrier resting on the external support on the one hand and the inner decoupling carrier and/or decoupling frame 38 on the other hand while the decoupling carrier 38 is firmly held in position and secured on the outer housing 30, via the leaf springs fixed on both ends, so that it is capable of standing any possible operational stresses. It is of course of decisive importance that the leaf springs 39a, 39b provided in this case must be capable, with the aid of associated highly sensitive weight sensors, to pick up any, even the slighest, change in weight, for example in the area of the bowl 37, and to supply the recorded value in the form of an analog signal to the installed microprocessor, for further processing and evaluation.

For, it is the inner decoupling carrier 38 which supports all other interior installations and elements of the food processor—this appears very clearly from the diagrammatic representation of FIG. 1—so that the leaf springs 39a, 39b finally carry the whole food processor and transmit the latter's weight to the outer housing. If one regards the food processor illustrated in FIG. 1 in an abstract way, then this concept of a food processor basically represents a leaf-spring balance of unique structure so that is also exhibits all the accuracy aspects and properties provided by such a leaf-spring balance for achieving the intended purpose. The leaf springs 39a, 39b, by which decoupling is achieved in a manner absolutely free from friction, carry weight sensors 40a, 40b in the form of resistance strain gauges which, for the sake of clarity, are represented in the drawing as clearly distinct units and which are equipped with the conventional circuitry, for example with Wheatstone bridges, for generating analog differential potentials and for transmitting them for further processing to highly precise electric circuits, such as analog-to-digital converters, filters or the like, all of them feeding the installed microprocessor.

Figure 2:
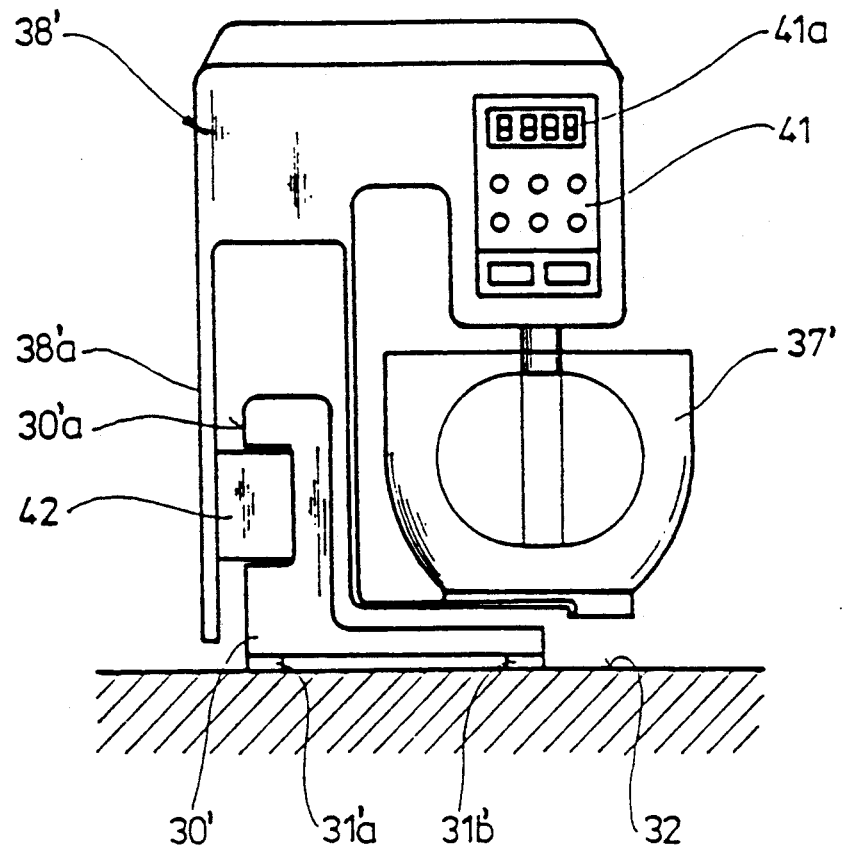
FIG. 2 shows a side view of another embodiment of a food processor, with the outer partial housing reduced to an inner stationary supporting member which is practically covered by the decoupling carrier, or rather its outer dimensions.

It is understood that the invention can be modified in many different ways. A prime example of such a modification is illustrated in FIG. 2, where the housing or partial housing, actually the outer element, is reduced to the form of a L-shaped inner carrier 30' resting on the support 32 via feet 31a', 31b'—in the manner described before—and carrying on its rear wall 30a', via a leaf spring measuring system of the design illustrated in FIG. 7, an overlapping rear wall portion 38a' of the decoupling carrier 38' which in this case basically determines the overall outer shape of the food processor. In this case, too, it is the decoupling carrier or decoupling frame which carries all components and utensils of the food processor, including the motor drive—not shown in the drawing—, an operating panel 41, the bowl 37', etc. It will be easily appreciated that this design also ensures good stability for the entire unit, due to the L shape of the outer carrier 30'.

Figure 3:
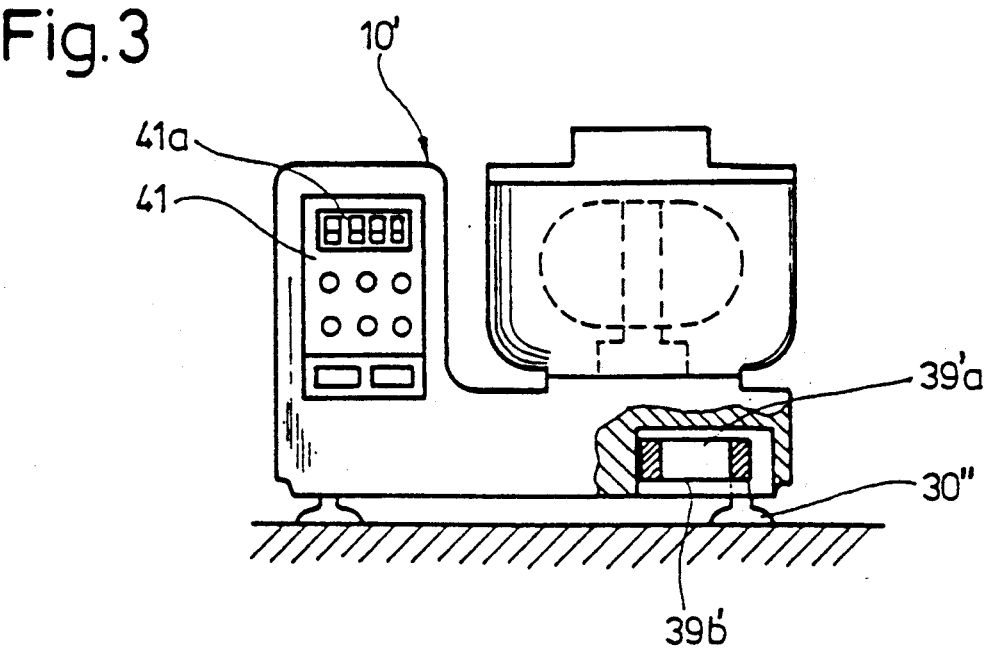
FIG. 3 shows a likewise diagrammatic representation of an embodiment of a food processor where only one of the feet is decoupled via a double leaf spring support.

The scope of the invention permits a food processor to be designed also in the manner illustrated at 10' in FIG. 3. In this case, the outer carrier has been reduced to a stationary foot portion 30' which is, however, again decoupled in a no-friction way relative to the remaining parts of food processor, via two leaf springs 39a', 39b'. The illustrated embodiment does not, however, constitute a preferred solution as in this case certain positional influences on the measuring results have to be accepted, due to the unilateral, likewise stationary mounting of the rest of the housing. The design of a food processor illustrated in FIG. 3 is, therefore, suited only when low demands are placed on the accuracy of the appliance.

Figure 4:
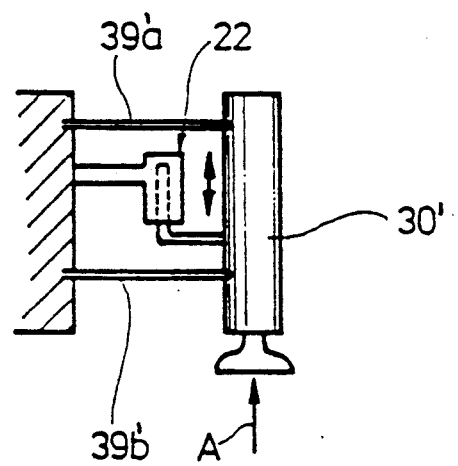
FIG. 4 shows a larger view of the supporting arrangement of the foot of the food processor.
Figure 5:
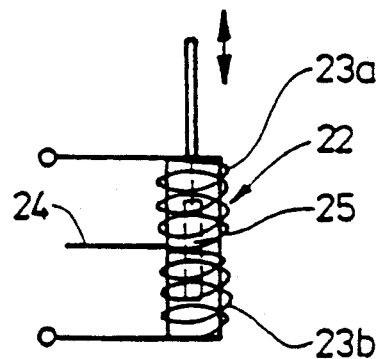
FIG. 5 in detail drawing showing another possible embodiment of a weight sensor in the form of a differential moving-coil arrangement.

FIG. 4 shows in this connection a possible variant of the weight sensor employed. Given the fact that in the case of such a leaf spring mounting, there is also the possibility, depending on the type and design of the leaf springs, that greater deflections may be encountered due to the parallel rod system so formed, other variants of weight sensors may be employed in this case, for example a differential coil system 22 of the type illustrated in FIG. 5. The differential coil system 22 as illustrated comprises two partial coil windings 23a, 23b separated by a center tap 24. A ferrite core 25, which may occupy a central or zero position at the beginning of the measurements, is subjected by the outer carrier foot 30' to a displacement in response to the weight. If the moving coil 23a, 23b so formed is supplied with an rf voltage, then electric detuning of the differential coil occurs inside the moving coil, depending on the relative variation in position of the ferrite core 25, and the amount of such detuning may then, after corresponding evaluation of the variation of the analog signal, be supplied to the microprocessor, via an analog-to-digital converter, as signal representing the actual weight.

Figure 6:
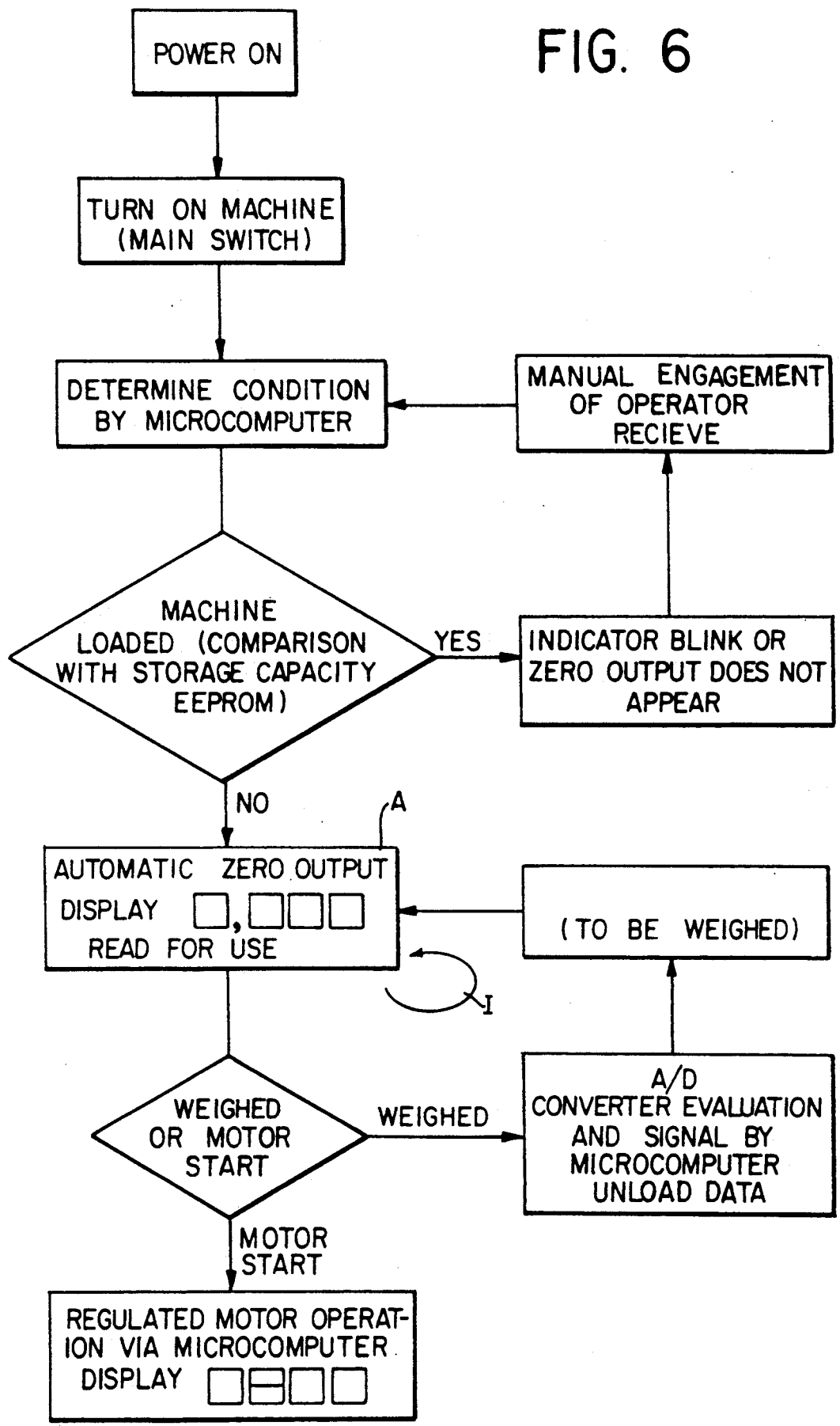

One embodiment of a suitable operational sequence (weighing process and processing operation carried out by one and the same food processor) may be organized in the form represented in FIG. 6 with the aid of different functional blocks. It should, however, be noted in this connection that the block diagrams represented in the drawings and illustrating the invention by way of discrete circuit or operating stages are not to be interpreted as limiting the invention, but are rather intended to illustrate the functional basic principles and to specify one possible practical embodiment for certain functional sequences. It goes without saying that the invention may be built up from individual circuit components or blocks in analog, digital or hybrid technique or may be composed of suitably organized groups of program-controlled digital systems, such as the before-mentioned microprocessor, microcomputer, or the like, which latter arrangement is preferred for the present embodiment of the invention.

The installed microprocessor controls on the one hand the mechanical operating sequence of the food processor which means, for example, that it may control the operating speed, maybe in accordance with a predetermined program sequence, and display the speed via a display 41a. During these operations, the microprocessor is of course relieved from any functions relating to weighing processes.

In the rest condition of the machine, i.e. before the machine is set into operation as a food processor, it may then be used as kitchen scales, either for occasional weighing of an object or a food quantity, or for subsequent processing of the weighed quantity in the same bowl.

The lettering in the functional blocks of the flow diagram illustrated in FIG. 6 explains the different processes with sufficient clarity. It may, however, be added that the loop I obtained in the weighing area may of course be repeated several times, for example when different ingredients are to be introduced into the food during preparation, for example when preparing a bread dough.

When automatic resetting to zero has been effected at the functional block A and it is then decided that instead of starting the motor, a weighing step is to be carried out, then the analog output signal of the respective pickup is recorded and converted by the analog-digital converter, whereupon the weight so determined is evaluated and displayed, it being of course also possible to have the values so gained stored by the microcomputer. Thereafter, a suitable outer key may be pressed to reset the system once more to zero and to make the microprocessor with the associated weighing system ready to record, display and evaluate the absolute weight of the next ingredient.

If a possibility is provided to extend the display, then the absolute weights of all the ingredients introduced into the bowl may be displayed, using a suitable numbering, so that the operator is provided with comprehensive information as to what quantities of what ingredients are contained in the bowl.

Upon completion of the weighing process, the operator may then start the motor. The microprocessor or microcomputer then leaves the weighing phase changing over to its control functions related to the electric/mechanical operating sequences of the food processor, such as speed control, or the like.

Figure 7:
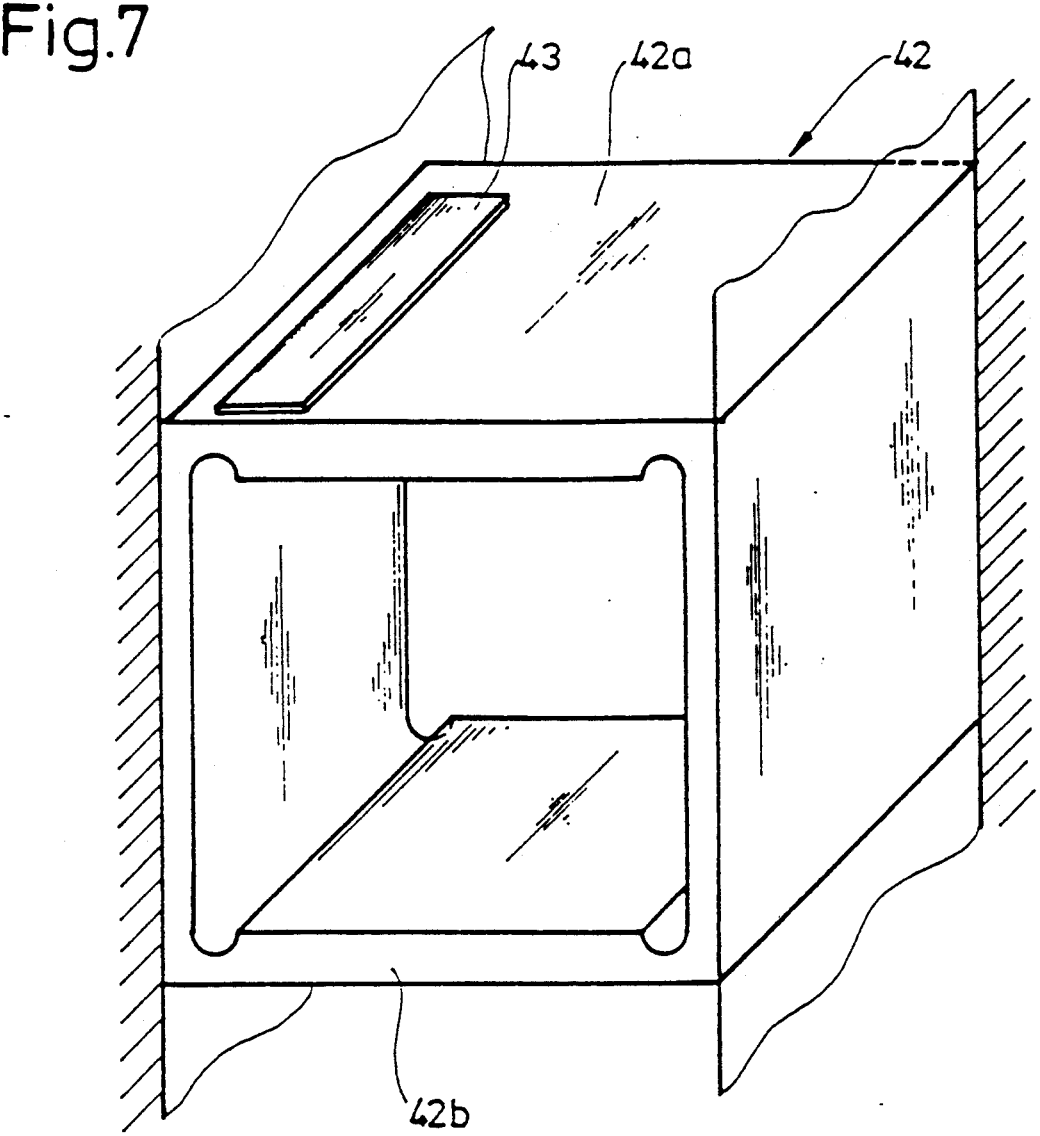
FIGS. 7 and 8 illustrate other imaginable embodiments of decoupling leaf spring or plate spring systems with associated pickups in the form of resistance strain gauges.
Figure 8:
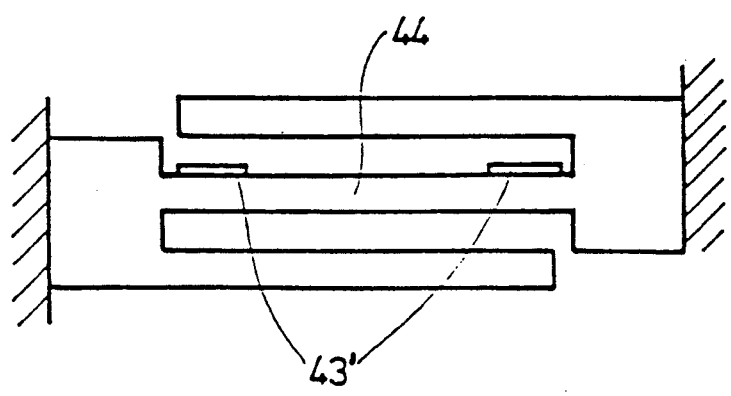

The two remaining variants illustrated in FIG. 7 and 8 as examples from the great variety of possible alternatives of designing the leaf springs comprise a block constituting a leaf-spring structure (perspective view of FIG. 7) which is firmly mounted or fixed on both sides, for example by welding, and whose spaced upper and lower connection surfaces 42a, 42b present the properties of leaf springs providing a no-friction coupling effect when a weight is applied, which effect is then picked up at a desired point by a sensor 43 in the form of a resistance strain gauge. The embodiment illustrated in FIG. 8 comprises a central connection web 44 which in this case provides the leaf-spring properties and which carries two sensors 43' in the form of resistance strain gauges mounted in suitable positions.

It should be finally noted that the claims and in particular the main claim are intended as attempts at formulating the invention, without comprehensive knowledge of the state of the prior art, so that they should not be interpreted as limiting the invention. Rather, it is understood that all the features described in the specification, the claims and the drawing may be regarded as essential to the invention either individually or in any combination thereof and may also be specified in the claims.

I claim:

1. In a food processor for any type of food preparation operations, said food processor being of the type including a stationary portion, a further portion including a compartment for holding ingredients to be processed, an associated weighing system and a central control unit displaying and evaluating the operating sequence of the food processor and weighing results, the improvement comprising:

the stationary portion being adapted to rest on a supporting surface for supporting said food processor on said surface, means for resiliently mounting and mechanically coupling said further portion to said statioanry portion so as to retain said portions in spaced relationship and in their positions of normal use, and said weighing system including at least one weight sensor means responsive to relative movement between said portions caused by weight variations occurring in said further portion.

2. Food processor according to claim 1, wherein said stationary portion includes one of an outer housing, partial housing and carrier portion provided with feet for resting permanently and stationarily on a stationary supporting surface, said other portion including one of an inner decoupling carrier and frame, said resilient mounting means comprising leaf springs serving as substantially the only mechanical connection between said portions, said other portion including a mixing mechanism, a drive motor, a stirring bowl, and a mixer beaker, in fully decoupled and non-friction relationship to said stationary portion.

3. Food processor according to claim 2, comprising an outer partial housing enclosing an inner decoupling frame on all sides, with vertically spaced leaf springs fixed on the one side between the two elements, and marginal areas of the outer partial housing being one of (i) in opposed relationship to matching wall portions of the inner decoupling frame and (ii) constructed to form a labyrinth-like transition to the latter, leaving a clearance for trouble-free operation.

4. Food processor according to claim 2, comprising a stationary partial housing in the form of an inner L-shaped carrier which rests on a stationary supporting surface via feet and which is connected to and covered by a decoupling frame, which takes the form of the machine housing, via a block exhibiting a leaf-spring structure.

5. Food processor according to claim 1, wherein the means for resiliently mounting comprises one of plate springs, rectangular hollows blocks and at least two vertically spaced leaf springs connecting the other portion, together with all the food processor components carried thereon, firmly with the stationary portion.

6. Food processor according to claim 1, wherein the weight sensors are constituted by resistance strain gauges arranged on the means for resiliently mounting and having analog output signals processed by an analog-to-digital converter, said processed signals being then supplied to the microprocessor for evaluation.

7. Food processor according to claim 6, wherein in the stationary position of the food processor the microprocessor is switched over to the function of processing weighing signals which are supplied to it by the weight sensors arranged in the area of the leaf springs, the weights recorded and computed by the microprocessor being then displayed on the display panel.

8. Food processor according to claim 7, wherein the circuit arrangement of the microprocessor is selected in such a way that at the end of a predetermined period of time the weight value recorded and displayed first is entered in the storage of the microprocessor and/or further displayed, while the weight indication is simultaneously and automatically reset to zero, whereupon the correct weight of newly added food quantities is displayed and likewise entered into a storage.

9. Food processor according to claim 8, wherein an external actuating arrangement (key) is provided for preparing the microprocessor for an additional, subsequent weighing operation, by resetting its weight indication to zero.

10. Food processor according to claim 1, wherein said weight sensor comprises one of displacement/force pickups and resistance strain gauges.

11. Food processor according to claim 1, wherein said weight sensor comprises one of a differential moving-coil arrangement, string balances, and proximity switch arrangements operating according to one of the inductive, capacitive and optical principle.

12. Food processor according to claim 10, wherein the weight sensor comprises a double leaf spring in the form of a parallel rod system and includes a stationarily supported differential moving coil enclosing a core which plunges into the coil a different length, depending on the weight present at any time.

* * * * *